United States Patent
Adamczyk, Jr. et al.

[19]

[11] Patent Number: 5,878,567
[45] Date of Patent: Mar. 9, 1999

[54] CLOSELY COUPLED EXHAUST CATALYST SYSTEM AND ENGINE STRATEGY ASSOCIATED THEREWITH

[75] Inventors: Andrew Anthony Adamczyk, Jr.; Scott Christopher Williams, both of Dearborn; Mario G. Meneghel, Southfield; Haren S. Gandhi, Farmington Hills, all of Mich.

[73] Assignee: Ford Global Technologies, Inc., Dearborn, Mich.

[21] Appl. No.: 589,437

[22] Filed: Jan. 22, 1996

[51] Int. Cl.$^6$ .......................................... F01N 3/00
[52] U.S. Cl. .................. 60/274; 60/284; 60/285; 60/299; 60/301; 423/213.7
[58] Field of Search ................ 60/274, 284, 299, 60/301, 285; 423/213.7

[56] References Cited

U.S. PATENT DOCUMENTS

| | | | |
|---|---|---|---|
| 3,908,371 | 9/1975 | Nagai et al. | 60/301 |
| 3,943,709 | 3/1976 | Holt | 60/274 |
| 4,023,359 | 5/1977 | Masaki et al. | 60/277 |
| 4,374,103 | 2/1983 | Gandhi et al. | 423/213.5 |
| 4,448,756 | 5/1984 | Hammerle et al. | 423/213.7 |
| 5,050,551 | 9/1991 | Morikawa | 123/305 |
| 5,102,853 | 4/1992 | Chattha et al. | 502/333 |
| 5,155,994 | 10/1992 | Muraki et al. | 60/275 |
| 5,179,059 | 1/1993 | Domesle et al. | 502/303 |
| 5,248,650 | 9/1993 | Sekiba et al. | 502/303 |
| 5,330,732 | 7/1994 | Ishibashi et al. | 423/213.2 |
| 5,332,554 | 7/1994 | Yasaki et al. | 422/180 |
| 5,349,816 | 9/1994 | Sanbayashi et al. | 60/277 |
| 5,388,401 | 2/1995 | Nishizawa et al. | 60/274 |
| 5,390,491 | 2/1995 | Suzumura et al. | 60/276 |
| 5,399,324 | 3/1995 | Subramanian et al. | 423/213.7 |
| 5,410,872 | 5/1995 | Adamczyk, Jr. et al. | 60/274 |
| 5,427,989 | 6/1995 | Kanesaka et al. | 502/66 |
| 5,439,865 | 8/1995 | Abe et al. | 502/333 |
| 5,444,975 | 8/1995 | Göhre et al. | 60/274 |
| 5,493,858 | 2/1996 | Hosoya et al. | 60/289 |
| 5,510,086 | 4/1996 | Hemingway et al. | 422/171 |

FOREIGN PATENT DOCUMENTS

| | | |
|---|---|---|
| 0661098 | 12/1994 | European Pat. Off. . |
| 2279697 | 1/1995 | United Kingdom . |

*Primary Examiner*—Thomas E. Denion
*Attorney, Agent, or Firm*—Donald A. Wilkinson; Roger L. May

[57] ABSTRACT

A catalytic converter having a first highly loaded palladium or trimetal catalytic element containing palladium of relatively large particle size closely coupled to the engine exhaust manifold, followed by one or more second catalytic elements having high oxygen storage capacity to provide protection against warmed-up engine emissions break through, is efficient in reducing cold-start emissions through early catalyst light-off. The catalytic converter is advantageously used in conjunction with an engine strategy employing oscillative spark retard during warm up to further reduce catalyst light-off and transient spark advance dampening to eliminate spiking of HC and CO during engine transients. When employed in conjunction with secondary air injection, the engine EEC is programmed to delay air injection for a period following cold-start sufficient to assure that catalyst light-off is rapidly attained.

21 Claims, 3 Drawing Sheets

CLOSELY COUPLED EXHAUST CATALYST SYSTEM AND ENGINE STRATEGY ASSOCIATED THEREWITH

TECHNICAL FIELD

The present invention pertains to a closely coupled catalytic system which is effective in reducing emissions from internal combustion engines. More particularly, the present invention pertains to a closely coupled catalytic system employing a highly loaded Pd or trimetal catalyst to enhance cold-start light off in conjunction with more lightly loaded catalysts to prevent emissions break-through under warmed-up conditions. The present invention further pertains to an engine strategy which optimizes emissions reduction.

BACKGROUND ART

Since the advent of emissions standards for internal combustion engines for cars, trucks, and other vehicles, emissions of hydrocarbons (HC), carbon monoxide (CO), and nitrogen oxides ($NO_x$) have markedly declined. This decline has been brought about through the use of a variety of techniques including electronic fuel injection (EFI), electronic (computerized) engine control (EEC), and the use of a variety of catalytic converters to oxidize hydrocarbons and carbon monoxide, and to reduce $NO_x$ to nitrogen. However, increasingly more stringent emissions standards, particularly those promulgated by the California Air Control Board, require still further emissions reductions over extended periods of engine operation.

For example, California's ULEV emissions levels of 0.04 g/mile HC, 1.7 g/mile CO, and 0.2 g/mile $NO_x$; or the European Stage III requirements of 0.1 g/Km HC, 1.5 g/Km CO, and 0.1 g/Km $NO_x$ are difficult to meet with current equipment, and yet more difficult to sustain over 50,000 mile and 100,000 mile use periods. During emissions testing, a considerable amount of total emissions occur during engine warm-up after a room temperature soak. During this time period, the emissions-reducing catalysts located in the catalytic converter(s) are largely ineffectual due to the fact that they have not reached a temperature at which significant catalytic activity can be maintained (light-off). Thus, particular attempts have been made to decrease emissions during engine warm-up.

Among the devices used to decrease cold-start emissions are electrically heated catalysts to ensure rapid light-off; exhaust system burners, either EGI or fuel burners; close-coupled catalysts, and cold start spark retard and enleanment (CSSRE) or hydrocarbon traps. The first four of these are means of more rapidly heating the exhaust catalyst, thus reducing the light-off time and resultant cold-start emissions. The last are means of collecting hydrocarbons prior to exiting the system, and reusing them as fuel. In general, the above devices require additional hardware, packaging space, and cost.

For example, U.S. Pat. No. 5,349,816 discloses an internal combustion engine having a closely coupled catalyst to reduce HC and further downstream catalysts for reducing $NO_x$. The first catalyst is active during warm-up, following which a flapper valve bypasses the first catalyst, directing the exhaust exclusively to the downstream catalysts. The use of the electronically controlled flapper valve adds to component cost as well as introducing additional components capable of failure into the vehicle. The closely coupled catalyst is used during cold-start only, representing a non-economical application of expensive catalyst components.

In U.S. Pat. No. 5,332,554, a two-stage catalytic converter is disclosed, the first converter containing an unspecified pretreatment catalyst, the second converter having multiple monolithic catalyst elements, a first element having deposited on its upstream end a multi-layer platinum/palladium catalyst containing 0.35 g/l to 1.0 g/l (9.9 $g/ft^3$ to 28.3 $g/ft^3$) of palladium. Located further downstream is a further oxidizing catalyst. The necessity for a pretreatment catalyst increases the cost and complexity of the system. The U.S. Pat. No. 5,332,554 system is not believed capable of meeting upcoming, more stringent emissions standards.

In U.S. Pat. No. 5,179,059 are disclosed catalysts having improved light-off behavior prepared by impregnating active aluminum oxide, containing customary promoters, with platinum, palladium, and rhodium, followed by associating the precious metal catalysts with up to five times their mass of base metal. Amounts of palladium of c.a. 6.5 $g/ft^3$ are disclosed.

It has also been proposed to further lower hydrocarbon emissions by injection of air into the exhaust stream by engine-driven or electrically driven air pump. For example, U.S. Pat. No. 5,410,872 discloses supplying air to maintain a stoichiometric increase in oxygen in the range of 0.5 to 1.5 volume percent excess oxygen. However, addition of air during cold-start conditions has the effect of reducing the temperature of the exhaust gases, thus increasing the time for catalyst light-off.

It would be desirable to provide a catalyst system which is capable of meeting ultra-low emissions levels by lowering cold-start emissions without the use of active components such as electrical heaters, fuel burners, flapper valves, and the like. It would be desirable, also, to minimize the light-off of such catalyst systems by employing a cold-start, light-off-assisting engine strategy. It would be further desirable to lower emissions through the optional use of air injection without significantly delaying catalyst light-off. It would be yet further desirable to maintain lowered emissions during warmed-up engine operation by eliminating spikes and break-through of CO and HC during this phase of engine operation.

SUMMARY OF THE INVENTION

It has now been surprisingly discovered that the use of a highly loaded palladium or trimetal catalytic element of high stability induced by incorporation of lanthanum, barium, zirconium oxide or stabilized cerium oxide, and having relatively large size Pd particles, closely coupled to the exhaust of an internal combustion engine in conjunction with more lightly loaded catalytic elements located downstream, provides sharply reduced cold-start emissions, resulting in the ability to meet ultra low emission levels by wide margins in a completely passive system. It has been further unexpectedly discovered that an engine strategy involving delayed air injection and ignition retardation cycling provides for further cold-start reductions while maintaining driveability, and that ignition retardation dampening yet further reduces HC and CO spikes and break-through during warmed-up operation.

DESCRIPTION OF THE PREFERRED EMBODIMENTS

The ultra-low emissions system of the present invention, in its simplest aspect, comprises a closely coupled catalytic converter employing a first, highly loaded palladium or trimetal catalytic element closely coupled to the engine exhaust manifold, together with more lightly loaded catalysts located downstream from the first catalytic element. This system acts as an entirely passive emissions reduction system capable of reducing emissions to below the California 1998 emissions levels and below the European Stage III emissions levels, both by a wide margin.

In preferred embodiments, the closely coupled ultra low emissions system is employed together with an emissions reduction engine strategy which optionally includes addition of secondary air ahead of the first catalyst element to the catalyst at controlled portions of the engine cycle, as more fully set forth below.

The first, highly loaded catalytic element may be of the palladium or trimetal type. The active catalytic components are supported on traditional catalyst supports such as alumina, optionally in conjunction with known catalyst promoters such as cerium, lanthanum, and other metal oxides, on ceramic or metal substrates. In the preferred system, the first catalytic element contains palladium at a level of at least 100 $g/ft^3$, preferably at least 150 $g/ft^3$, more preferably at least 200 $g/ft^3$, and particularly about 250 $g/ft^3$. A range of 100 $g/ft^3$ to 300 $g/ft^3$ is highly suitable. When the fuel supplied is low sulfur fuel, for example fuel containing about 50–100 ppm sulfur or less, it is preferred that substantially all precious metal of the catalyst be palladium. When the sulfur content of the fuel is greater than 100 ppm, and particularly in the "normal" range of c.a. 300 ppm, it is desirable that a "trimetal" catalyst be used, i.e. a catalyst having substantial amounts of palladium but further incorporating other precious metals such as platinum and rhodium associated with the palladium to minimize catalyst poisoning due to sulfur contained in the fuel. Such trimetal catalysts should contain at least 100 $g/ft^3$ palladium equivalent, defined as an amount of platinum group metals, particularly Pd, Pt, and Rh, which provides the same degree of hydrocarbon reduction as a palladium-only catalyst deposited on a like support, and having a catalyst 50% light-off time of 40 seconds or less. Such catalysts typically contain minimally 60–75 $g/ft^3$ or more of palladium in conjunction with other precious metals to provide 100 $g/ft^3$ palladium equivalent, and correspondingly higher amounts of palladium to provide higher palladium equivalents, preferably in the range of 100 $g/ft^3$ to 300 $g/ft^3$.

The first, highly loaded palladium or trimetal catalysts are prepared using traditional methodology but with higher metal levels and relatively larger palladium particle size. Traditional palladium particle sizes range from about 5 Å to 15 Å, while those of the first catalytic element are relatively larger, for example in the range of 60Å to 1500 Å, and preferably in the range of 100 Å to 600 Å. The larger particle sizes are prepared by methods known to the skilled artisan, for example by employing a less porous substrate. The catalytic metals may be coated on traditional monolithic ceramic substrates of cordierite, mullite, alumina, etc. For example, a cordierite monolith having 400 square channel cells per square inch may be coated with a gamma alumina wash-coat by dipping the monolith into a dispersion of gamma alumina, drying, and firing to provide a wash-coated substrate. The gamma alumina dispersion may contain catalyst promoters, either in solution or dispersion, and may further contain metal catalyst salts such as platinum, rhodium, and/or palladium chlorides, generally with a modest quantity of nitric acid. After firing, the wash-coated substrate is loaded with palladium by immersion in a concentrated palladium salt solution, optionally with additional metal salts, and firing. The amount of palladium may be increased by further dipping/firing steps until the desired loading of palladium is obtained. The substrate may be further subjected to additional catalyst deposition where desired to render the catalyst less subject to catalyst poisoning or to increase catalyst conversion efficiency with respect to a particular emissive class, e.g. HC, CO, or $NO_x$. Treatment with platinum and/or rhodium salts and firing to deposit metallic platinum and/or rhodium (trimetal catalysts) is preferred when precious metals other than just palladium are used.

The first, highly loaded palladium or trimetal catalyst must be closely coupled to the exhaust of the internal combustion engine. By "close coupling" is meant a location minimally spaced apart from the engine exhaust but at a distance such that catalyst deactivation does not occur due to overheating of the catalyst. It has been found that a position approximately 6 to 9 inches (15 cm to 23 cm) from the engine exhaust manifold outlet is highly satisfactory. For palladium or trimetal catalysts with high heat resistance, a closer location, for example 4 inches (10 cm) may be suitable. Locations greater than 9 inches (23 cm) away are less desirable due to the reduced temperature of exhaust gas impinging upon the catalyst which delays catalyst light-off under cold-start or partial cold-start conditions. However, due to the exceptionally low emissions brought about by the present invention, distances of up to about 12 to 18 inches (30 to 46 cm) may be tolerated without increasing emissions beyond tolerable levels. For maximum decrease in emissions, the distance of the first catalytic element from the exhaust manifold is preferably not greater than 15 inches (38 cm), preferably about 12 inches (30 cm) or less, and most advantageously, as stated, between 6 inches and 9 inches (15 cm and 23 cm, respectively).

The ultra low emissions system of the subject invention further comprises one or more second catalytic elements, which may be the same or different, which further decrease emissions as well as maintaining reduced emissions during warmed-up engine operation. A second catalytic element may be a less highly loaded palladium or trimetal catalyst or other catalyst, preferably located proximate the first catalytic element. For example, a suitable second catalytic element is a gamma alumina-supported palladium catalyst having a palladium loading of 50 $g/ft^3$ of palladium or higher, preferably at least 80 $g/ft^3$, and more preferably at least 100 $g/ft^3$. Equivalent trimetal catalysts as hereinbefore described are also suitable. The nature of the second catalytic element is not as critical as that of the first, since early light-off, for which the first catalytic element is employed, is not a major concern. Moreover, as the second catalytic element is located further downstream in the exhaust system, the second catalytic element does not have to contend with the high exhaust temperatures proximate the exhaust manifold, and hence more common redox catalysts which would deactivate at the high temperatures experienced by the first catalytic element may be used. Preferably, the second catalytic element contains finely dispersed palladium in close proximity to cerium oxide or oxides of praseodymium to achieve high and stable oxygen storage capacity.

The second catalytic element may be located within the same catalytic converter housing as the first catalytic element, or may be located in a separate catalytic converter attached to the first by the customary flanges and sealing gaskets. Preferably, the upstream-most second catalytic element is located approximately 4 inches (10 cm) to 15 inches (38 cm) from the downstream end of the first catalytic element, more preferably 6 inches (15 cm) to 10 inches (25 cm), and most preferably about 7 inches (18 cm). When two or more second catalytic elements are utilized, these are preferably located in the same converter housing, and spaced 0.5 inch (1.2 cm) to 5 inches (13 cm) apart, more preferably 1 inch (2.5 cm) to 2 inches (5 cm) apart. Most preferably, two second catalytic elements are used, each having a palladium loading of from 50 $g/ft^3$ to 150 $g/ft^3$, more preferably about 100 $g/ft^3$, and particularly 110 $g/ft^3$. Higher loadings of palladium or other metals are also useful, but little improvement in emissions is obtained, while cost is adversely affected.

Figure 3:
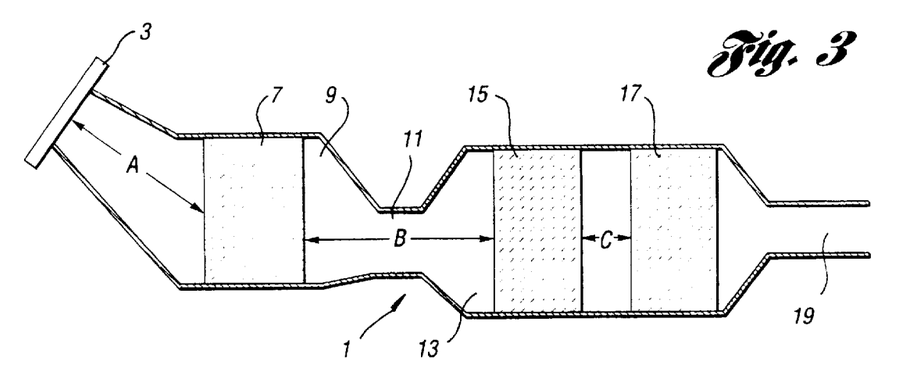
FIG. 3 illustrates a non-limiting physical embodiment of the catalyst system of the subject invention.

One embodiment of a suitable catalytic converter is shown in FIG. 3. Two similar embodiments have been tested and found highly effective. In the first embodiment, the catalytic converter 1 contains first catalytic element 7 which is a cordierite monolith supported catalyst having a length of approximately 2.85 inches (7.2 cm) to 3.15 inches (8 cm) and an oval cross-section with a 5.68 inch (14.4 cm) major axis and 2.68 inch (6.81 cm) minor axis containing approximately 400 square cells per inch having a wall thickness of 6.7 mils and a cross-sectional area of 13.3 $in^2$ (85.8 $cm^2$). The monolith is wash-coated and palladium loaded as described herein, and contains 250 $g/ft^3$ of Pd. The first catalytic element 7 is positioned approximately 7.5 inches (dimension A) from the termination of the exhaust manifold of one four engine cylinder bank of a 4.6 l V8 engine. The converter is attached to the exhaust manifold by connecting flange 3. The cross-sectional shape of the catalyst support is not critical, and may be circular, square, or of other shape as well. The material of construction of the support may also be of metal, or may be a thin wall ceramic substrate. The converter may, of course, be mounted on other engines as well.

Beyond the downstream end of the first catalytic element, the converter chamber 9 is advantageously narrowed at 11 to maintain gas velocity and encourage thorough mixing of exhaust gas components, prior to again expanding to a second chamber 13 containing two second catalytic elements 15 and 17, cordierite monoliths wash-coated with gamma alumina and having deposited thereon 110 $g/ft^3$ palladium. The two second catalytic elements are spaced apart by approximately one inch (2.5 cm) (dimension C), and the upstream side of the upstream-most of the second catalytic element is approximately seven inches (18 cm) from the downstream side of the first catalytic element (dimension B). The downstream-most end of the converter second chamber is reduced to approximately 2 inches (5 cm) at 19 for attachment to the vehicle exhaust/muffler system by conventional means. In a second embodiment, the first catalytic element is located but 5 inches (12.7 cm, dimension A) from the exhaust manifold, and the upstream face of the upstream-most second catalytic element is positioned 6.5 inches (16.5 cm, dimension B) from the downstream face of the first catalyst element. The drawing is approximately to scale.

While the first and second catalytic elements have been described as being supported on ceramic monoliths, with the catalysts of the subject invention, metallic supports, i.e. stainless steel mesh or honeycomb supports are also feasible, particularly when used with secondary air injection as described hereinafter. The use of thin-walled ceramic and metal substrates can be important in eliminating back pressure, and the use of metal substrates can be a means of eliminating mat mount erosion in closely coupled catalysts.

While the ultra low emissions level catalytic systems of the subject invention may be used in internal combustion engines employing conventional on-board computer electronic emissions control (EEC) strategies, further reduction in total emissions are made possible by employing emissions reducing cold-start and warmed up engine control strategies as well. Moreover, these strategies may be used to decrease emissions when other types of catalytic converters are utilized.

A first engine control strategy is termed an "oscillative spark retard." This strategy is utilized during cold-start operation to enhance catalyst light-off while maintaining driveability. In the modern internal combustion engine, near stoichiometric air/fuel ratios are utilized to lower emissions while maintaining power output. Combustion is generally highly efficient c.a. 98% and only a minor fraction of hydrocarbon fuel is not combusted, much of the uncombusted fuel located in "trapping zones" between the top piston surface and portions of the cylinder wall, or in the spaces proximate the piston sealing rings. Of the total energy output resulting from combustion, in a normal engine cycle, approximately 30 percent of the heat of combustion represents heat loss to the water jacket or equivalent, approximately 30 percent is lost as heat through the exhaust, and about 40% is reflected in the engine driving force. These percentages are approximate, and vary from engine to engine and from one operating condition to another. One of the factors which influences the proportions of heat directed to these categories is the degree of spark advancement.

The ignition system is generally designed to ignite the air/fuel mixture at a point prior to the piston having reached top dead center (TDC). Ignition before TDC allows a greater period of time for the air/fuel mixture to combust, resulting in higher cylinder pressure and greater power output. By retarding the spark, i.e. by reducing the advancement before TDC, the peak cylinder pressure is reduced, however emissions and combustion efficiency is virtually unchanged. The result of retarding the spark is lower power output and increased loss of heat through the exhaust. While this effect is undesirable in warmed-up engine operation, during cold-start conditions, the increased heat to the exhaust system enabled by retarding the spark may be used to reduce catalyst light-off time, thus lowering cold-start emissions. Unfortunately, retarding the spark, particularly while the engine is cold, results in poor throttle response and inferior driveability. Applicants have discovered that by oscillating spark retardation by 4–17 degrees with an oscillation frequency of about 1–20 Hz once a stable, post-start rpm is achieved, driveability is enhanced while catalyst light-off time may be reduced significantly.

The EEC unit may be used to provide the requisite oscillation in spark retardation. The EEC may be programmed to retard the spark in a defined cylinder or group of cylinders in a periodic or random manner, or may be programmed to retard the spark in all cylinders, again in a periodic or random manner. However, the spark retardation is not a constant retardation spread uniformly over all cylinders or a cylinder or group of cylinders. When such constant spark retardation is practiced, although early catalyst light-off is encouraged, engine roughness and/or loss of power output results in poor driveability.

Introduction of secondary air is not required with the catalyst system of the present invention. However, secondary air can be used to further aid in emissions reduction, and becomes increasingly important in maintaining reduced emissions after 50,000 mile or 100,000 mile extended use periods. In current systems employing secondary air, the air is supplied by an engine driven air pump or an electrically driven pump. In the case of the former, either secondary air must be injected into the exhaust stream at all times, or it may bypass the exhaust system by means of an electronically actuated valve. In the case of electrically driven air pumps and engine driven pumps with bypass arrangements, the operation of such devices is generally controlled by the vehicle on-board computer. Such devices call for secondary air immediately upon start-up.

However, when secondary air is injected into the exhaust gas stream during cold-start, the injected air decreases the exhaust gas temperature, thus delaying catalyst light-off. The increase in emissions due to delayed light-off more than offsets the decrease in emissions due to availability of excess oxygen. Applicants have discovered that total emissions may be considerably reduced in secondary air injection systems when secondary air injection is delayed until satisfactory catalyst light-off has been achieved, or delayed preferably until just before light-off. Rich engine mixtures are frequently supplied during cold start to enhance combustion stability and driveability. Under these conditions, although a sufficient temperature has been reached to allow light-off, the lack of oxygen prevents conversion. Supplying secondary air at this stage allows the catalyst to function effectively with minimum delay.

The delay in injecting secondary air is best controlled by the EEC which may incorporate a fixed time delay after start-up, or which may signal injection of secondary air by monitoring a temperature sensing device located in the exhaust system, preferably proximate the first catalytic element. Injection of secondary air is preferably delayed until a light-off temperature corresponding to 50% emissions conversion across the catalyst (50% light-off temperature) has been obtained, more preferably until a temperature of the first catalytic element has been reached which is not less than 50% of the 50% light-off temperature measured in °C., more preferably about 80% of this temperature, and most preferably about 90% of this temperature. As has been indicated, the temperature at which secondary air injection begins can be determined by monitoring a temperature sensing device whose electrical output is known to be associated with catalyst temperature, or may be programmed into the EEC as a fixed or variable time delay based on historical performance. The time delay may, for example, be eliminated if sensing devices detect an already warm engine, for example by cooling jacket water temperature, and may be overridden or adjusted by the output of one or more oxygen sensing devices.

The delay is preferably calculated as follows. The amount of secondary air is obtained by modulating the electrical input to the secondary air pump, or modulation of the output from a mechanical air pump, in correspondence with the specified A/F ratio to the engine. This can be a dynamic calculation during the light-off period of the catalyst or can be a prescribed amount. The amount of secondary air can be calculated in the EEC from the EEC $\lambda$ and the mass flow rate to the engine by:

$$\dot{M}_{secondary air} = \left( \frac{\lambda_{critical}}{\lambda_{engine}} - 1.0 \right) \times \dot{M}_{engine air}$$

The engine flow rate is either measured by the air flow meter or can be calculated in the EEC from engine speed and air density. $\lambda_{engine}$ is determined in the EEC from its cold-start look-up-tables and cold start fuel compensation tables. $\lambda_{critical}$ is specified at $1.0 < \lambda < 1.05$ to allow an overall lean mixture at the catalyst.

The amount of delay time before secondary air application, $t_{critical}$, can be calculated in the EEC by:

$$\int_0^{t_{critical}} \dot{M}_{engine} C_p \Delta T dt = \frac{\%}{100} \times E_{crtical}$$

where $\dot{M}_{engine}$ is the mass flow rate from the engine, $C_p$ is the heat capacity of exhaust and $\Delta T$ is a known temperature in the exhaust and $E_{critical}$ is the necessary amount of energy delivered to the catalyst for light-off.

In all current engine systems, a delay occurs due to the time-lag associated with changes in engine monitoring devices, and also due to the delay in the parameter being sensed being physically applied to the sensors. For example, oxygen and temperature sensing devices have chemical and thermal inertia which prohibit them from immediately responding to changes in their respective sensing environments. Moreover, increases in air flow and fuel are not immediately reflected in changes in the exhaust proximate the sensors due to the physical time delay necessary for the air/fuel mixture to be combusted and travel to the sensing area. For these reasons, and to a lesser extent due to the speed of the computational elements within the EEC, transient conditions may occur where air/fuel ratio and/or secondary air injection are not optimal for minimizing emissions. Such transients occur even in warmed-up engines during expected operational cycles, particularly during acceleration. In such cases, "spiking" of HC and CO emissions, in particular, may occur. While the catalytic system of the subject invention reduces the severity of such spiking, Applicants have surprisingly discovered that dampening the spark advance/retard during engine transients is effective to further eliminate HC and CO spikes.

In the traditional EEC, the degree of spark advance/retard is determined by monitoring the air and fuel flow to the engine and the throttle position. The EEC is conventionally programmed to advance or retard the spark to a particular value before TDC which optimizes engine horsepower (during acceleration) and minimizes emissions at the particular engine RPM, generally assuming a steady state, rather than a transient condition.

Thus, the sensors associated with an engine operating at a particular rotational speed at a spark advance of, for example, 8° before top dead center (TDC), upon sudden acceleration, will cause the EEC to calculate and set a spark advance of, for example 14° BTDC. However, the sudden increase of advance from 8° BTDC to 14° BTDC will create a transient condition likely to result in increased HC and CO emissions for a short time, a so-called "spike." Applicants have discovered that by dampening the called-for change in spark advance, by requiring the total advance to occur over a short but extended time period rather than instantaneously, transient HC and CO spiking is substantially eliminated without significantly affecting driveability. The dampening is preferably such that the rate of advancement change is less than 80°/s/1000 rpm.

Most preferably, the catalytic exhaust system of the present invention is employed together with oscillative cold-start spark retard and dampened spark advance as a combination engine strategy to facilitate maximum reduction of emissions, optionally with delayed cold-start secondary air injection.

By the term "oscillative spark retard" is meant a periodic or random oscillation of spark advancement from a highly power efficient, relatively advanced condition BTDC to a less advanced and less power efficient condition BTDC such that a greater portion of sensible enthalpy of combustion is directed to the engine exhaust. By the terms "transient suppression" and "spark advance dampening during engine transients" and like terms is meant a method of reducing the rate of spark advance from a first condition of advance to a second condition of advance during sudden changes in vehicle operating parameters such as, but not limited to, air flow, fuel flow, and throttle position, when spark advance is called for. During such transients, spark advance is calculated by the EEC based on current values provided to the EEC by various sensors, for example an air flow sensor, fuel flow sensor, throttle position sensor, oxygen sensor, temperature sensor, or the like.

The spark advance calculated by the EEC is generally such so as to provide stable power output, minimal emissions, and optimum fuel economy at the instantaneous sensor inputs assuming static operation. For emissions reducing transient suppression, the EEC compares the newly calculated value of spark advance with the previous value stored in the EEC, and signals the ignition system to provide a degree of advance between the calculated instantaneous value and the stored value. The actual amount of spark advance may be a fixed percentage of the difference between the stored value and instantaneous value, or may be calculated based on a proportional algorithm stored in the EEC processor or look-up table associated therewith. The new value of spark advance then replaces the stored value and a further intermediate proportional spark advance is calculated by the EEC. This process continues until the actual spark advance is equal to the instantaneous advance called for by the sensed parameters. This instantaneous value may be the same calculated previously or may be a new value dictated by the then current sensed parameters. As used herein, the term "spark advance", when associated with transient reduction, also includes retardation of the advance, or spark retard, during transient conditions.

By the term "delayed cold-start secondary air injection" and like terms is meant a delay in the time at which air injection into the engine exhaust and/or catalytic converter is commenced following cold-start of the vehicle. The air injection is delayed until the first catalytic element of the catalytic converter has achieved some degree of catalytic activity, and is preferably delayed until the temperature of the first catalytic element has reached 50%, and more preferably 80% to 90% of the 50% catalyst light-off temperature, measured in °C. The EEC may be programmed to operate a flapper value admitting secondary air or to start an electrically driven air pump after a constant delay determined from a look-up table which may have a variety of delay times based on the water jacket temperature, the ambient temperature, and/or the catalytic converter or other temperatures, or may calculate the delay period based upon these or other sensed parameters. By these means, air injection delay may be longer when ambient temperatures are lower, and shorter in the case of higher ambient temperatures and/or a partially warm engine. When parameters other than actual catalytic converter temperature(s) are used to calculate the delay, the EEC is provided with a look-up table and/or computational algorithm which supplies a delay consistent with an optimal delay based on measurements of the temperature of the first catalytic element measured under laboratory conditions, for example on a dynamometer, which reflect expected first element temperatures.

Having generally described this invention, a further understanding can be obtained by reference to certain specific examples which are provided herein for purposes of illustration only and are not intended to be limiting unless otherwise specified.

First Catalytic Element Description

The first catalyst monolith (brick) is coated with highly loaded (>100 g/ft$^3$) precious metals—ranging from 100 to 300 g/ft$^3$. In this catalyst, the major emphasis is to get the lowest possible light-off temperature and the highest HC conversion activity. Since the catalyst will operate at the highest exhaust temperature (closest to the engine), it has the greatest possibility of converting the difficult to oxidize low molecular weight saturated HC species, such as methane, ethane and propane. If remained unconverted on this first catalyst, the possibility of these hydrocarbon molecules being oxidized on the second or third catalyst in the direction of the flow is small. In addition, the first catalyst should also have the highest thermal stability built into its washcoat by incorporation of lanthanum, barium, $ZrO_2$ stabilized $CeO_2$, etc. The highly loaded Pd on this catalyst should have a relatively larger particle size once again to provide faster light-off and higher activity for HC molecules.

Second and Third Catalytic Element Description

The major role of the second (and if necessary third) catalyst bricks is to clean up the breakthrough of CO and HC from the first brick. As catalysts age (@50,000 to 100,000 miles), the catalyst oxygen storage capacity will be reduced. Thus, the 2nd and 3rd catalyst should be designed with higher oxygen storage capacity than the first brick and should have sufficient oxygen storage capacity to handle CO and $NO_x$ breakthrough. This can be achieved by having Pd particles finely dispersed and in close proximity to $CeO_2$ (or oxides of Praseodymium) particles so that the total oxygen storage capacity (the sum of $O_2$ stored over the previous metals and the rare earth oxides) is highest on these catalysts. Additionally, these oxygen storage materials should be stabilized with materials such as $ZrO_2$ for maintaining the highest dispersion of $CeO_2$ (or Praseodymium Oxides).

A closely coupled catalytic converter was constructed of type 304 stainless steel substantially in accordance with FIG. 3. Two of such converters were mounted, one for each bank of cylinders, on a Lincoln Town Car having a 4.6 1 V-8 engine. This car/engine configuration was chosen as one where meeting vehicle emissions in g/mile or g/Km would be more difficult due to both larger vehicle weight and engine size.

Figure 1:
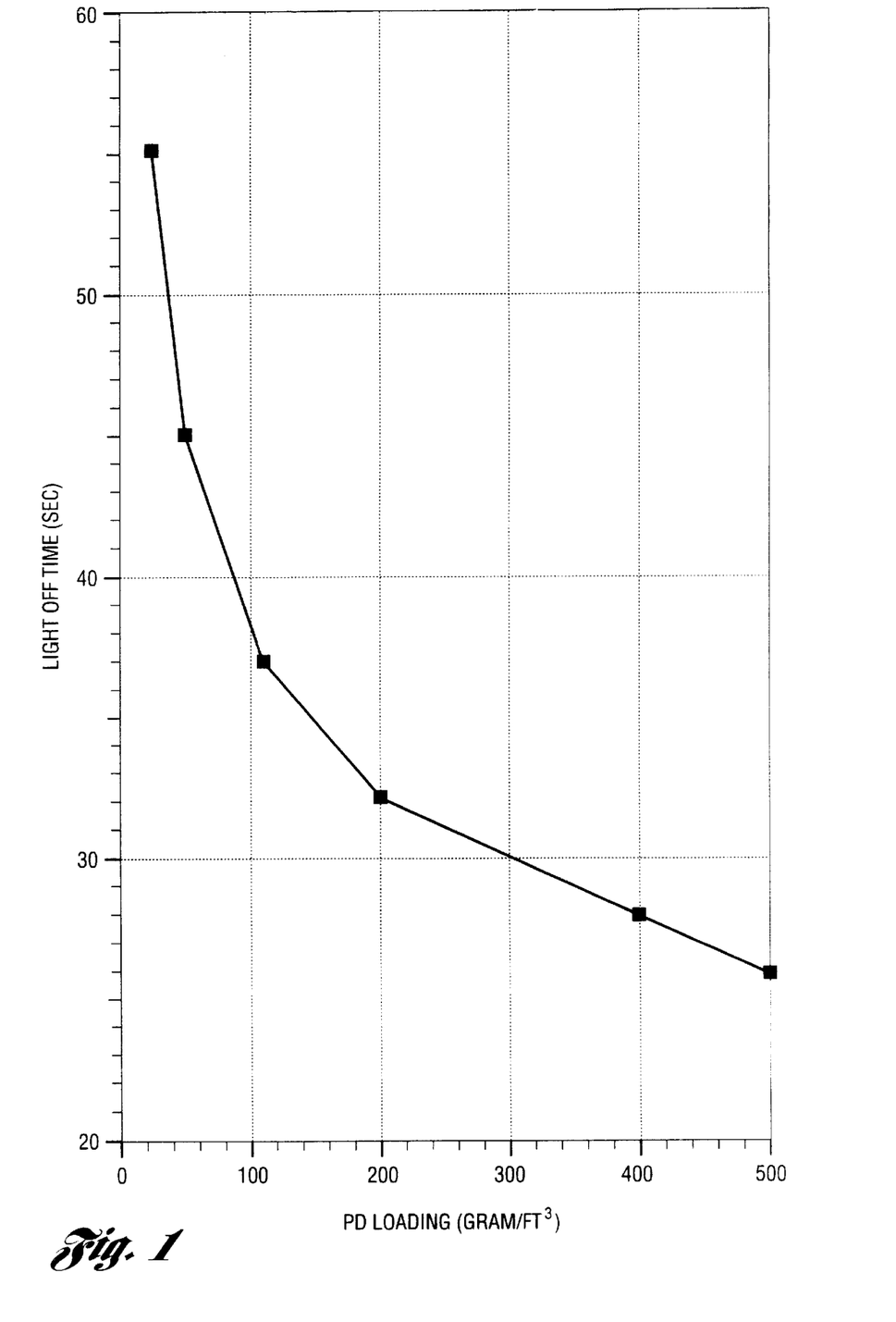
FIG. 1 illustrates the decrease in 50% light-off time when using the heavily loaded catalysts of the subject invention.

FIG. 1 illustrates the improvement in 50% light-off time associated with the catalytic system of the present invention. Significant and unexpected decreases in catalyst light-off time were found when the Pd concentration in the first catalytic element was in the range of 100–200 g/ft$^3$. Further, loading of palladium showed a correspondingly further lowering of light-off time which is substantially linear with respect to Pd concentration. To ensure a reasonable margin of emissions reduction efficiency over extended operating periods, catalyst loading in the range of 150–250 g/ft$^3$ is considered optimal, with higher loadings feasible at increased cost without significant effects on light-off time.

Figure 2A:
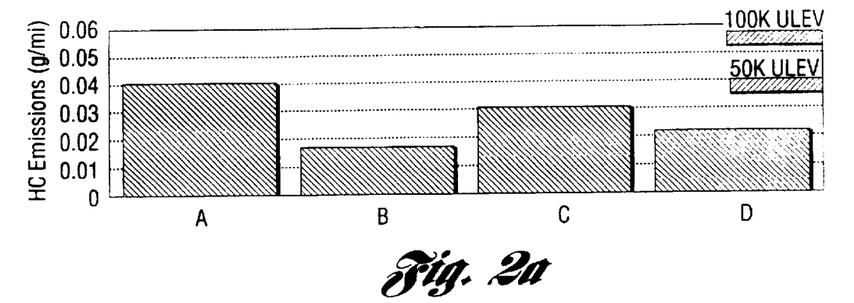
FIGS. 2A–2C illustrate the improvement in HC, CO and $NO_x$, levels provided by the subject invention.
Figure 2B:
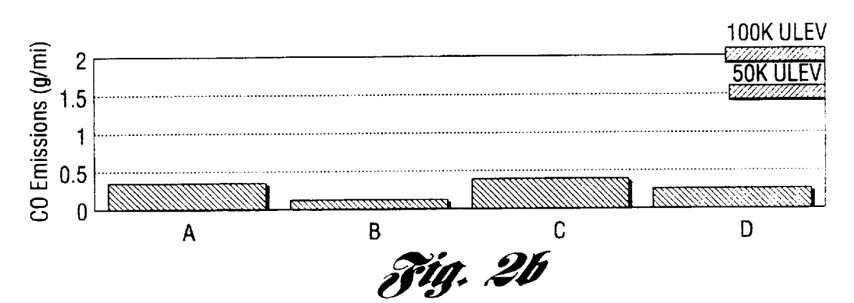
Figure 2C:
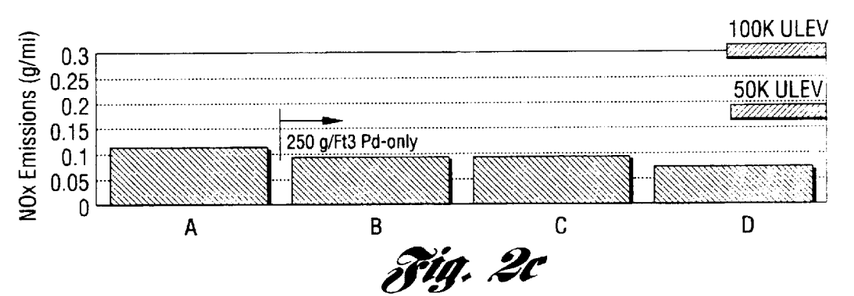

FIGS. 2A–2C illustrate the improvement in HC, CO, and $NO_x$ emissions using the catalytic converter described above, with and without optional secondary air injection. The base vehicle is a commercial Lincoln Town Car with 4.6 engine which meets current (1995) emissions standards. At the top left of each Figure are horizontal bars representing 1998 ULEV standards. Emissions of HC and CO are lower than the base vehicle after 4000 miles by a considerable margin when 250 g/ft³ Pd first catalytic elements are used with no air, 4000 miles, (B); no air 100,000 miles, (C); and with optional air, 100,000 miles (D). $NO_x$ level are also reduced, but by a lesser amount. The base vehicle HC emissions have already approached or exceeded 50,000 mile ULEV levels at only 4000 miles, while the subject catalyst, without optional air, is below this level even after 100,000 miles. The use of secondary air injection results in further lowering of emissions at 100,000 miles for each emissions category.

Figure 4:
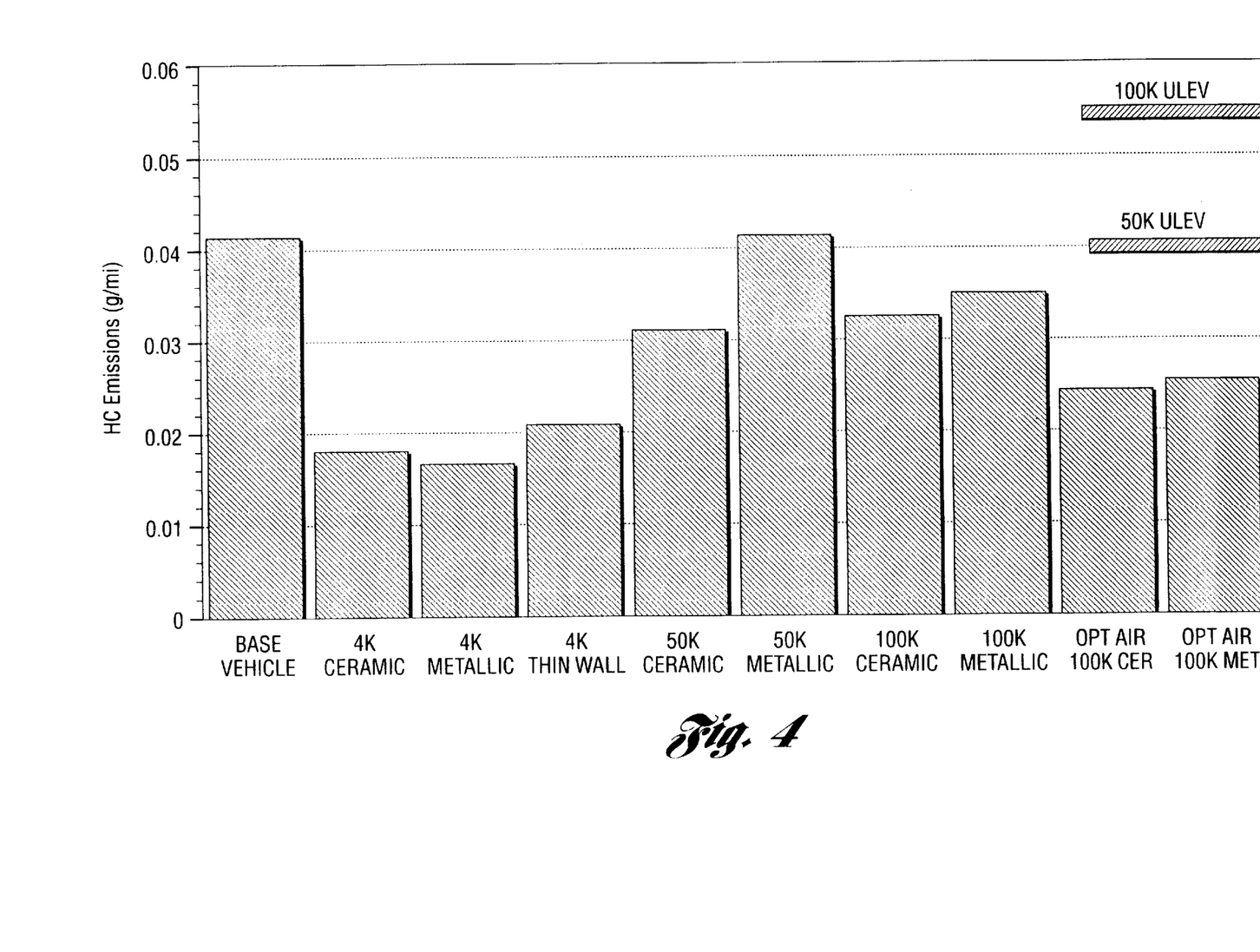
FIG. 4 illustrates emissions reductions in catalyst systems employing ceramic and metallic substrates.

FIG. 4 compares base vehicle HC emissions at 4000 miles with ceramic and metal substrate catalysts of the subject invention with and without optional secondary air injection after various extended use periods. The value for the metallic substrate catalyst after 50,000 miles may be in error as it is actually higher than the value after 100,000 miles. Note that the metallic substrate catalyst offers a considerable margin in emissions over the 50,000 mile and 100,000 mile 1998 requirements when optional secondary air is used.

Having now fully described the invention, it will be apparent to one of ordinary skill in the art that many changes and modifications can be made thereto without departing from the spirit or scope of the invention as set forth herein.

What is claimed is:

1. A closely coupled catalytic converter system exhibiting rapid light-off and low start-up emissions, comprising:
    a) a first catalytic element comprising a wash coated substrate having deposited thereon palladium of large particle size in an amount greater than about 100 g/ft³, said washcoat having high thermal stability;
    b) at least a second catalytic element comprising a wash-coated substrate having deposited thereon one or more metals efficient for reducing one or more of hydrocarbon, carbon monoxide, and nitrogen oxide emissions from an exhaust gas stream and having a higher oxygen storage capacity than said first catalytic element;
    wherein said first catalytic element is closely coupled to an exhaust manifold of an internal combustion engine.

2. The catalytic converter system of claim 1 wherein said first catalytic element exhibits a cold-start 50% light-off time of about 30 seconds or less.

3. The catalytic converter system of claim 1 wherein at least one of said at least one second catalytic elements comprises a wash coated substrate having deposited thereon palladium in an amount of about 50 g/ft³ or more, or a mixture of two or more precious metals including a majority of palladium such that a palladium equivalent of 50 g/ft³ or more is obtained, said washcoat of said at least one of second catalytic element contains stabilized cerium oxide and/or praseodymium oxide.

4. The catalytic converter system of claim 1 wherein said at least one second catalytic element comprises two second catalytic elements, each of said two second catalytic elements independently comprising a wash coated substrate having palladium or a mixture of two or more precious metals including a majority of palladium deposited thereon, such that the average loading of palladium between said two second catalytic elements is about 50 g/ft³ or greater, or where mixtures of two or more precious metals are used, the average palladium equivalent is about 50 g/ft³ or greater, said washcoat of said at least one of second catalytic element contains stabilized cerium oxide and/or praseodymium oxide.

5. The catalytic converter system of claim 1 wherein said first catalytic element is spaced apart from the exhaust manifold of an internal combustion engine by a distance of between 4 and 12 inches, wherein said first catalytic element contains at least about 150 g/ft³ palladium or palladium equivalent, and wherein said at least one second catalytic element comprises two second catalytic elements, each of said two second catalytic elements having a palladium loading of at least about 50 g/ft³ or palladium equivalent of about 50 g/ft³, said two second catalytic elements together having an average palladium loading of greater than about 80 g/ft³ or a palladium equivalent of greater than about 80 g/ft³.

6. A method of reducing the cold-start emissions of an internal combustion engine producing an emissions-laden exhaust stream comprising:
    a) treating the exhaust stream of said engine by passing said exhaust stream through a catalytic converter system of claim 1; and
    b) oscillatively retarding a spark advance of said engine during a warming-up period following cold-start such that catalyst light-off time of said first catalytic element is decreased.

7. A method of reducing cold-start emissions of an internal combustion engine producing an emissions-laden exhaust gas stream and having means for injecting secondary air into said exhaust stream, comprising:
    a) treating the exhaust stream of said engine by passing said exhaust stream through a catalytic converter system of claim 1;
    b) substantially preventing secondary air from entering said catalytic converter system for a secondary air-delaying time period following cold-start until said first catalytic element of said catalytic converter system has reached a temperature which is at least about 50% of the 50% catalyst light-off temperature of said first catalytic element.

8. The method of claim 1 wherein said secondary air delaying time period is such that said temperature of said first catalytic element is at least about 80% of the 50% catalyst light-off temperature of said first catalytic element.

9. A method of reducing cold-start emissions of an internal combustion engine producing an emissions-laden exhaust stream and having means for injecting secondary air into said exhaust stream, comprising:
    a) treating the exhaust stream of said engine by passing said exhaust stream through a catalytic converter system of claim 1;
    b) oscillatively retarding the spark advance of said engine during a warming up period following cold-start such that a catalyst light-off time of said first catalytic element is decreased;
    c) substantially preventing secondary air from entering said catalytic converter system for a secondary air-delaying time period following cold-start until said first catalytic element of said catalytic converter system has reached a temperature which is at least about 50% of the 50% catalyst light-off temperature of said first catalytic element.

10. The method of claim 9 wherein said secondary air delaying time period is such that said temperature of said first catalytic element is at least about 80% of the 50% catalyst light-off temperature of said first catalytic element.

11. A method of reducing total engine emissions from an internal combustion engine producing an emissions-laden exhaust gas stream, comprising:

a) treating the exhaust gas stream of said engine by passing said exhaust stream through a catalytic converter of claim 1;
b) preventing emission spikes of CO and HC during transient engine conditions caused by a sudden change in one or more engine operating parameters from a first engine operating condition to a second engine operating condition during a warmed-up period of engine operation comprising:
  b)i) calculating an instantaneous optimal spark advance from engine operating parameter sensors based on said second engine operating condition;
  b)ii) comparing said instantaneous optimal spark advance value to a stored spark advance value corresponding to said first engine operating condition;
  b)iii) calculating a dampened spark advance value which lies between said instantaneous optimal spark advance and said stored spark advance value and causing an ignition system of said internal combustion engine to advance the spark to said dampened spark advance value;
  b)iv) storing said dampened spark advance value as a new first engine operating condition stored spark advance value;
  b)v) repeating steps b)i) to b)iv) until a stable transient-free second engine operating condition is reached.

12. The method of claim 11 wherein during a warming up period following a cold-start of said internal combustion engine, the 50% catalyst light-off time is reduced by oscillatively retarding a spark advance of said internal combustion engine.

13. The method of claim 11 wherein said internal combustion engine has associated therewith a means for injecting secondary air into said exhaust stream, and wherein injection of secondary air is delayed for a period of time following cold-start such that the temperature of said first catalytic element has reached a temperature which is at least 50% of 50% catalyst light-off temperature of said first catalytic element expressed in °C.

14. The method of claim 13 wherein said period of time is such that the temperature of said first catalytic element has reached a temperature which is at least about 80% of the 50% catalyst light-off temperature.

15. The method of claim 11 wherein said catalytic converter comprises three catalytic elements, said first catalytic element having palladium or its trimetal palladium equivalent deposited thereon in an amount of greater than 100 g/ft$^3$ and two of said second catalytic elements, at least one of said two of said second catalytic elements having palladium or its trimetal equivalent deposited thereon such that the average loading of palladium or its trimetal equivalent between said two second catalytic elements is greater than about 50 g/ft$^3$.

16. The method of claim 15 wherein the palladium or palladium equivalent of said first catalytic element is about 200 g/ft$^3$ or more, and said average loading of palladium or its trimetal palladium equivalent of said two of said second catalytic elements is greater than about 80 g/ft$^3$.

17. The method of claim 15 wherein the palladium or palladium equivalent of said first catalytic element is about 250 g/ft$^3$ or more, and said average loading of palladium or its trimetal palladium equivalent of said two of said second catalytic elements is greater than about 100 g/ft$^3$.

18. The method of claim 16 wherein at least one of said two of said second catalytic elements is a non-palladium-containing, emissions-reducing catalyst.

19. The method of claim 16 wherein said first catalytic element is positioned from 4 inches to about 12 inches from an exhaust manifold outlet of said internal combustion engine.

20. A low emissions motor vehicle driven by an internal combustion engine producing an emissions-laden exhaust stream, said motor vehicle having associated therewith an engine emissions reduction system and optionally associated therewith a means for injecting secondary air into said exhaust stream, comprising:
a) an emissions reducing catalytic converter of claim 1;
b) an electronic engine control system programmed to perform at least one of the following engine emissions reduction strategies:
  b)i) oscillative spark retard for a period of time following cold-start such that a light-off time of said first catalytic element is decreased;
  b)ii) spark advance dampening during engine transients; and
  b)iii) when said internal combustion engine has associated therewith said optional secondary air injection means, delayed cold-start secondary air injection.

21. A closely coupled catalytic converter system exhibiting rapid light-off and low start-up emissions, comprising:
a) a first catalytic element comprising a wash coated substrate having deposited thereon a mixture of two or more precious metals including a majority of palladium of large particle size such that a palladium equivalent of about 100 g/ft$^3$ or greater is obtained, said washcoat having high thermal stability;
b) at least a second catalytic element comprising a wash-coated substrate having deposited thereon one or more metals efficient for reducing one or more of hydrocarbon, carbon monoxide, and nitrogen oxide emissions from an exhaust gas stream and having a higher oxygen storage capacity than said first catalytic element;
wherein said first catalytic element is closely coupled to an exhaust manifold of an internal combustion engine.

* * * * *